United States Patent Office 2,865,757
Patented Dec. 23, 1958

2,865,757

PROCESS OF MAKING CAKE CONTAINING PROTOPECTIN

Walter Aurell, New York, N. Y.

No Drawing. Application June 29, 1955
Serial No. 518,940

2 Claims. (Cl. 99—92)

The present invention relates to the art of dietetic and medicinal food products and more particularly to the art of baked food products containing pectinous material.

Pectinous materials, and especially protopectin, perform a beneficial function in the human stomach and intestinal tract. Protopectin is hemi-cellulose pectin and the parent substance, from which pectin is derived by the removal of the hemi-cellulose therefrom. Although pectin may be used in accordance with certain phases of the present invention, protopectin is found more desirable. Protopectin breaks down as it passes along through the body into pectins, pepsins, and fibrous materials and forms a hemi-cellulose mass which serves to give intestinal regularity without the deleterious effects of laxatives. Protopectin also adds fiber and roughage to the diet. Moreover, it absorbs water in the body and stomach and swells, thereby affording a feeling of satiety and reducing inclination to eat. For that reason, protopectin is also highly desirable as a means by which food intake may be controlled by a person with a minimum of discomfort and annoyance and with resulting reduction in the weight of the person.

Protopectin in commercial form is a powder and although suitable for the purposes indicated, is, in some instances, difficult to handle and to administer. When fed by spoon, it develops a sticky quality in the mouth and adheres to the teeth and gums with objectionable results. This can be avoided if the protopectin is administered in gelatin capsules. However, the effectiveness of the protopectin in this form will be materially reduced, since it is desirable that the protopectin be dispersed and masticated with saliva to attain the full enzymatic action therefrom. Furthermore, as the capsule dissolves, it has been found that it often gelatinizes the surface of the powdered mass of protopectin, so that it balls up in the stomach, thereby preventing its dispersion and reducing its effectiveness.

It would be desirable to incorporate protopectin in pastries and other baked flour food products, such as cookies, biscuits, waffles, crackers and the like. However, one difficulty in employing protopectin in this form is that the resulting food product would be hard and difficult to break with the teeth and difficult to masticate, unless the concentration of the protopectin were reduced to the point, where the medicinal, dietetic and other benefits of the protopectin were almost insignificant.

One object of the present invention is to provide a new and improved mixture of flour and protopectin, which contains a comparatively high concentration of protopectin, but which nevertheless can be moistened, kneaded and baked to produce a crisp, tasty, delectable food product, easily and pleasantly consumable and containing the protopectin in dispersed, easily assimilable form for effective action in the stomach and intestinal tract.

Another object of the invention is to provide a new and improved process for producing the improved food product described.

In accordance with the present invention, it has been discovered that by using as the basic ingredient of a baking mix a flour of low gluten content, the resulting food product baked therefrom will not be hard and cementitous, even with a comparatively high percentage of protopectin in said mix. The flour should be such, that the mix with the protopectin, when worked into a paste does not possess extreme tackiness, extreme adhesiveness and rubber-like consistency, but is rather a blended mass or batter, which on drying would have good break-away quality, i. e., would tend to crumble rather than to form a hard cake. For that purpose, the flour should not be one which has high protein content, which has been enriched with glutinous matter, or which has been highly processed or bleached, since such a flour with high gluten content, or processed starch content is highly cementitous and will often produce a hard cake when combined with protopectin.

Some specific low-glutinous flours which may be employed for the purpose of the present invention are soft winter wheat flour and potato flour. Although such a flour may not have sufficient adhesiveness in the mix to produce a coherent food product, it has been found that the protopectin serves as a binder to impart the necessary adhesiveness to the mix to produce a crisp good food end product.

It has also been found that the protopectin in the mix when watered will swell and that if the protopectin is allowed to soak up water too long before baking, even in the presence of flour of low glutinous content, the resulting product will be somewhat too tough for satisfactory use. With flour of low glutinous content, protopectin can be used in the proportions of 10 to 25 parts by weight of dry protopectin for every 100 parts of flour, if the period between the watering of the mix and the beginning of the baking cycle is not prolonged too long. The greater the concentration of protopectin in the mix, the shorter the maximum interval between the watering and baking required to avoid the production of a hard cake or mass. In specific examples, it has been found that a dry mix in which the protopectin is 25 parts by weight for every 100 parts by weight of flour, should be placed in the oven within 7 minutes, after being combined with water. A dry mix containing 20 parts of protopectin should be placed in the oven within 10 minutes after being combined with water; and a dry mix containing 15 parts of protopectin should be placed in the oven within 15 minutes after being combined with water. A dry mix containing 12½ parts of protopectin, should be placed in the oven within 20 minutes after being combined with water; and a dry mix containing 10 parts of protopectin, should be placed in the oven within 40 minutes after being combined with water.

A normal protopectin which may be satisfactorily used for the purpose of the present invention, is of 40 to 60 mesh average size and is such that one gram of the dry protopectin absorbs 10–25 cc. of water at a pH of 5.9. If the protopectin does not swell easily or quickly enough for the purpose of the present invention, it is most likely due to the fact that the particles of the protopectin have been so treated in the manufacturing process as to harden and seal off the surfaces of the particles, and thereby to render them impervious to water. Such a protopectin may be made suitable for the purpose of the present invention, by breaking up the particles to expose their porous interiors.

Although a certain amount of swelling of the protopectin in the liquid-mix should take place before baking to assure the necessary adhesiveness to form a coherent crisp cake or mass, the protopectin should not swell so completely as to impart so much adhesiveness to the mix that a hard baked product is produced. Also, it is important and desirable that some of the swelling of the protopectin be delayed until the protopectin reaches the stomach, in order to attain the feeling of satiety and other desirable results with the protopectin in the body.

It has been found, especially with fast-acting protopectin, i. e., one which swells quickly when brought into contact with water, that it would be desirable to add the protopectin after all of the other ingredients including the water, have been mixed, thus to reduce the interval between the addition of the protopectin and the start of the baking cycle. This prevents the protopectin from swelling excessively before the liquid mix is ready for the oven and from producing a hard product. Also, where the amount of protopectin in the mix is high, this protopectin should be added last in the mix. This allows some of the swelling to take place in the stomach.

The shortening in the mix may have the effect of covering the protopectin therein and of thereby inhibiting the absorption of some of the water by the protopectin, especially during the mixing. It is desirable, therefore, to add the protopectin to the mix under conditions, which will prevent the excessive sealing of the protopectin by the shortening against water asbsorption. The adding of the protopectin as the last step will prevent such excessive sealing of the protopectin.

The following preferred example illustrates a certain way in which the principle of the invention has been applied, but is not to be construed as limiting the broader aspects of the invention.

A mix is formed having the following composition:

|  | Parts by weight |
|---|---|
| Potato flour | 100 |
| Shortening fat or oil | 35 |
| Sugar (light brown) | 60 |
| Egg (fresh) | 12 |
| Protopectin (average of 40–60 mesh) | 10 |
| Bicarbonate | 4–6 |
| Water | 55 |

Flavor as desired.

The composition described above is made up into a wet mix, shaped into cookies and baked. The period between the time the protopectin is in the presence of water in the mix and the time the cookies are placed in the oven should not exceed 40 minutes.

It has been found that in certain cases, it may be desirable to employ fast-acting and slow-acting protopectins in combination in a mix. The fast-acting protopectin, may, for example, be employed primarily as a binder in the formation of the mix and for useful function in the initial stages of ingestion, while the slow-acting protopectin may function usefully in the later stages of ingestion in the body.

Also, it has been found that for reducing purposes, there may be employed a new and improved low calorie sweetening agent, which is harmless and which does not have the undesirable taste of saccharin. The preferred new sweetening agent is propylene glycol, which can be used in conjunction with the protopectin-low glutinous flour mix described above or can be employed in any other flour mix where low calorie contents are desired. This propylene glycol serves not only as a sweetening agent but also as a shortening material.

The following example, illustrates the manner in which a baked food product can be made with propylene glycol as the sweetening agent, to produce a low calorie cookie.

|  | Parts by weight |
|---|---|
| Flour | 100 |
| Fat or oil | 15 |
| Propylene glycol (treated to remove impurities) | 35 |
| Fresh egg (egg yolk) | 12 |
| Bicarbonate | 4–8 |
| Water | 60 |

Flavor as desired.
Bake at 325°–450° F.

In this composition with propylene glycol, the protopectin may be left out, in which case the flour may be of any suitable type usually employed to make cookies. If protopectin is added, the flour should be of the low glutinous type indicated above and the protopectin should be employed under the conditions described above.

While the invention has been described with particular reference to specific embodiments, it is to be understood that it is not to be limited thereto, but is to be construed broadly and restricted solely by the scope of the appended claims.

The invention claimed is:

1. The process of making a cake product having dietetic and medicinal properties, which comprises making a batter including flour of low glutinous content and protopectin in the proportions of 10 to 25 parts by weight of protopectin to 100 parts by weight of the flour, and baking the mixture within 40 minutes from the time the protopectin is brought into contact with the liquid in the batter.

2. A process according to claim 1 in which the addition of the protopectin constitutes the final step in the assembling of the mixture.

References Cited in the file of this patent

UNITED STATES PATENTS

| 1,268,135 | McElroy | June 4, 1918 |
| 1,795,980 | Wahl | Mar. 10, 1931 |
| 1,964,940 | Epstein | July 3, 1934 |
| 2,145,016 | Spalding | Jan. 24, 1939 |
| 2,557,524 | Wade | June 19, 1951 |

FOREIGN PATENTS

| 347,512 | Great Britain | Apr. 30, 1931 |
| 385,796 | Great Britain | Jan. 5, 1933 |

OTHER REFERENCES

"Bakers Helper," July 8, 1950, page 58.

"The Pectic Substances," by Z. Kertesz, 1951, published by Interscience Publ. Inc. (New York), pp. 183, 184, 559 and 560.

"Chemische und backtechnische Untersuchungen an kunstiicgeb Teigen," by A. Rotsch in "Brot u. Geback," 1954, 8, pp. 129–130 (abstracted in Food Science Abstracts, vol. 27 (1955), page 326).